United States Patent [19]

Gulistan

[11] Patent Number: 4,621,961
[45] Date of Patent: Nov. 11, 1986

[54] CAPTIVE PANEL FASTENER

[76] Inventor: Bulent Gulistan, 20568 Pinnacle Way, Malibu, Calif. 90265

[21] Appl. No.: 706,960

[22] Filed: Feb. 28, 1985

[51] Int. Cl.⁴ ............................................. F16B 21/10
[52] U.S. Cl. .................................. 411/352; 411/533; 411/999
[58] Field of Search ............... 411/337, 338, 339, 352, 411/353, 366, 368, 371, 372, 533, 535, 908, 44, 45, 57, 60, 383, 426, 378, 531, 361, 999; 384/428, 271, 276, 295

[56] References Cited

U.S. PATENT DOCUMENTS

| | | | |
|---|---|---|---|
| 1,038,834 | 9/1912 | Bloom | 384/271 |
| 2,592,130 | 4/1958 | Erb | 411/908 |
| 2,796,907 | 6/1957 | Dumas | 411/55 |
| 3,056,852 | 10/1962 | Sachs | 411/60 |
| 3,076,668 | 2/1963 | Famely | 411/44 |
| 3,126,935 | 3/1964 | Tuozzo | 411/361 |
| 3,434,746 | 3/1969 | Watts | 411/41 |
| 4,218,954 | 8/1980 | Morel | 411/44 |
| 4,478,532 | 10/1984 | Puro | 411/338 |
| 4,494,347 | 1/1985 | Uhlig | 411/44 |

FOREIGN PATENT DOCUMENTS 2459608 8/1975 Fed. Rep. of Germany ...... 403/408

Primary Examiner—Thomas J. Holko
Assistant Examiner—Carl M. DeFranco
Attorney, Agent, or Firm—Poms, Smith, Lande & Rose

[57] ABSTRACT

A captive panel fastener includes three parts, a screw, a tapered bushing, and a slotted expandable sleeve. The bushing fits closely over the shank of the screw, and has an outwardly extending shoulder or flange at its lower end away from the head of the screw, to retain the expandable sleeve in the expanded condition. The slotted sleeve has a cylindrical upper flange which is generally co-extensive with the head of the screw, and has a lower flange which in the initial or relaxed condition is smaller than the panel hole through which the captive fastener is to be secured. Following insertion of the shank of the screw and the unstressed slotted sleeve into a hole in a panel where the fastener is to be secured, further pressure on the head of the fastener forces the sleeve into the bushing, expanding the lower end of the sleeve, so that its lower slotted flange grips around the lower edge of the panel.

16 Claims, 5 Drawing Figures

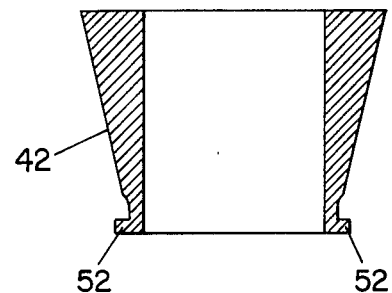
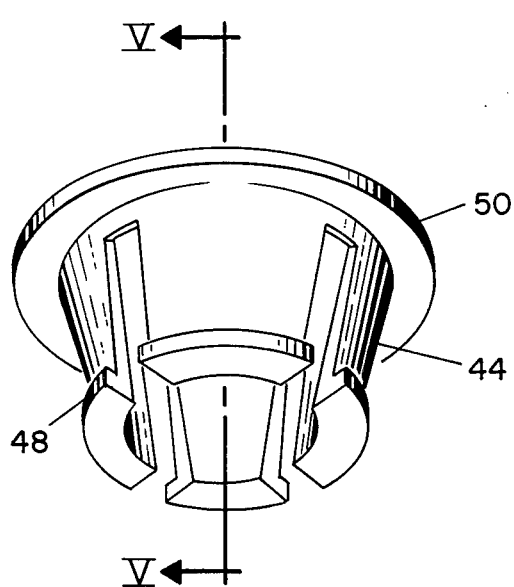
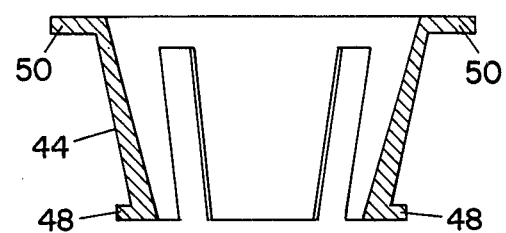

CAPTIVE PANEL FASTENER

FIELD OF THE INVENTION

This invention relates to captive screws, or panel fasteners, wherein the fastener is held in position extending through a hole in a panel, and secured to the panel, ready for the threaded end of the fastener to be secured to a nut or into a tapped hole, for example.

BACKGROUND OF THE INVENTION

Captive screws or captive panel fasteners are well known in the industry. This type of fastener is arranged so that a screw is held in position extending through an opening in a panel, with the threaded end of the screw extending out the other side of the panel. When large panels with many fasteners are used, for example, in aircraft asesmblies, it is important that these fasteners be properly held in position, with the fastener held captive on the panel ready for the securing of the threaded end of the fastener to a nut or into a tapped hole.

One way in which screws have previously been held in position extending through openings in a panel has been through the use of a slotted sleeve with a tapered outer or lower end, and a flange which underlies the head, at the upper end of the sleeve. Immediately behind the tapered end of the sleeve, is a shoulder, so that the screw, with the sleeve attached, may be forced through the hole in the panel, and then, hopefully, the lower end of the sleeve will spring back into its expanded state with the shoulder extending over the remote edge of the hole to hold the fastener onto the panel.

Captive screws of the type described in the preceding paragraph are not entirely satisfactory for a number of reasons. First, the sleeve, which is made of aluminum must be formed of a special type of resilient heat treated aluminum, or it may undergo a "set" so that it will not expand and properly engage the panel after insertion through the panel. In addition, the slotted sleeve must be fairly loose, to permit contraction as the tapered portion of the sleeve is forced through the hole in the panel, and this looseness may reduce the shear load capability of the fastener. It is further noted that the prior fastener as described above normally requires that the fasteners be pounded into the panel so that there is a rapid flexing of the aluminum sleeve, to avoid a "set" and to insure securing of the sleeve in the panel hole. Certain problems have also been encountered with the prior fasteners as described above, in that the retention is not very good, and even laying the panel on a table may cause some of the fasteners to pop out from the panel. In addition, special preparation or chamfering of the input hole in the panel is recommended for use in connection with captive screws of the type mentioned above.

Accordingly, a principal object of the present invention is to avoid the problems of prior types of captive screws or panel fasteners as described hereinabove.

SUMMARY OF THE INVENTION

In accordance with a specific embodiment of the present invention, a captive screw assembly for fastening through a hole of a predetermined diameter in a panel, includes three parts, first a screw having a cylindrical shank and an outer thread; second, an inner tapered bushing tapering away from the head of the screw and mounted on the shank thereof, with the bushing having a small outwardly extending flange at its lower end, away from the head of the screw; and third, a sleeve having flanges at both ends, and having an enlarged upper flange generally co-extensive with the head of the screw, and with the body of the sleeve being slotted and the slots extending through the lower end of the sleeve, and the smaller flange located at this lower end. When the sleeve is in the initial relaxed state, it is spaced down on the bushing, and the lower flange is smaller than the size of the hole in the panel through which the fastener is to be secured. The fastener is then inserted into the hole in the panel so that the panel abuts against the upper flange of the slotted sleeve. The head of the fastener is then pressed toward the panel, thus forcing the tapered bushing into the sleeve and expanding the lower slotted end of the sleeve away from the head of the screw so that it overlies or captures the panel. Further, the lower shoulder or small outwardly extending flange on the tapered sleeve engages the lower inner corner of the sleeve, and prevents disengagement.

In accordance with another aspect of the invention, a captive panel fastener may include a head; an outwardly extending shank; an expandable sleeve having an upper flange for underlying said head, and a smaller lower flange for initially extending through a hole in the panel; and a tapered bushing on said fastener shank adjacent to the head thereof for expanding the lower flange of said sleeve starting from the same side of the panel as the head of the fastener as said fastener is pressed into said hole to expand the flanged lower end of said sleeve to engage said panel on the other side thereof from the head of the fastener.

Advantages of the present invention include the fact that when assembly is complete, there is a good tight hole-filling fit so that the shear load handling capability of the fastener is significantly increased as compared with prior types of panel fasteners. In addition, there is no possiblity for the sleeve to take a "set", as it is positively expanded and held in the expanded position by the tapered bushing. Also, the fastener may be secured in place by slow steady pressure even with a person's thumb, and sharp rapping with a hammer is not required. While special types of aluminum may be required for prior types of panel fasteners, this is not necessary in the present case and any virtually type of aluminum, steel or other suitable material may be employed in the manufacture of the sleeves in accordance with the present invention. Further, the tolerances of the hole diameter may be relaxed, and no special hole preparation, such as the provision of a chamfer, is needed.

Other objects, features and advantages of the invention will become apparent from a consideration of the following detailed description and from the accompanying drawings.

BRIEF DESCRIPTION OF THE DRAWINGS

FIG. 3 is a cross-sectional view of the bushing included in the panel fastener of FIG. 2;

FIG. 4 is a perspective view of the expandable sleeve included in the assembly of FIG. 2; and FIG. 5 is a cross-sectional view of the sleeve of FIG. 4.

DETAILED DESCRIPTION

Figure 1:
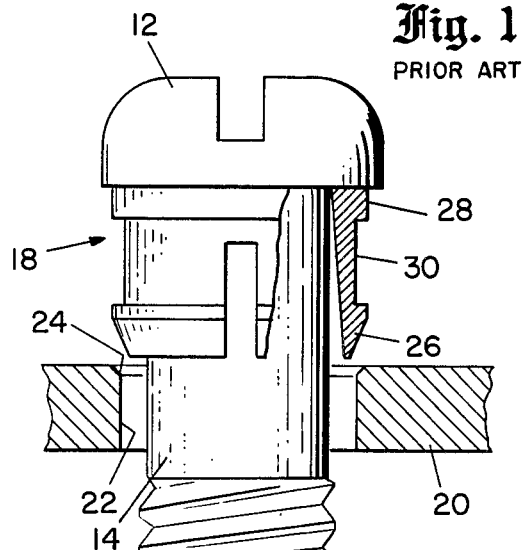
FIG. 1 is a partial cross-sectional view of a prior art captive panel fastener.

Referring more particularly to the drawings, FIG. 1 shows a prior art captive screw or panel fastener. In FIG. 1 the screw includes a head 12, a cylindrical shank 14, and threads 16 which may be rolled onto the shank 14 of the screw, with the slotted sleeve 18 in place so that it is held onto the shank of the screw. The panel 20 into which the screw is to be secured, has a hole 22 with a chamfered corner 24 to facilitate the reception of the tapered end 26 of the sleeve 18. The upper end of the slotted sleeve 18 may be provided with a flange 28 which is co-extensive with or slightly smaller than the diameter of the head 12 of the screw.

The fastener shown in FIG. 1 may be secured to the panel 20 by rapping the head 12 with a hammer, forcing the sleeve 18 down into the opening 22 as a result of the taper 26 engaging the upper edge of the hole 22 so that the sleeve is compressed to fit through the hole. This necessarily means that there is a substantial tolerance or space between the lower ends of the slotted sleeve 18 and the cylindrical shank 14 of the screws. If the lower end of the sleeve 18 does not take too much of a set as a result of being compressed, the panel 20 will be held in the recess 30 on the outside of the sleeve 18.

The present invention is illustrated by the panel fastener shown in FIGS. 2 through 5 of the drawings. As shown in these figures, a fastener 34 has a head 36, a cylindrical shank 38 and threads 40 at the lower or outer end of the screw 34 away from the head 36. A tapered stainless steel bushing 42 is slidably mounted on the shank 38 of the screw 34, and a slotted sleeve 44 serves to hold the assembly in position on the panel 46.

Figure 2:
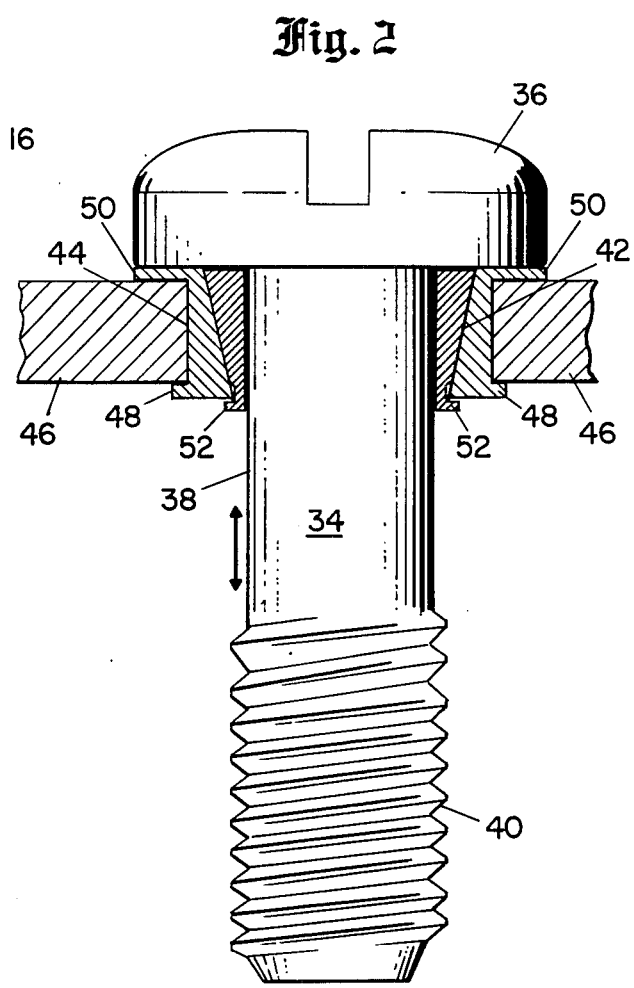
FIG. 2 is a cross-sectional view of a fastener illustrating the principles of the present invention.

The showing of FIG. 2 is, of course, the final assembled position of the panel fastener, while FIGS. 3, 4 and 5 show the bushing and the slotted expansion sleeve in their disassembled states. It is particularly to be noted that, when the sleeve 44 is in its relaxed or initial state, the lower flange 48 thereof through which the slots pass, has a diameter which is slightly less than that of the hole through the panel 46. In addition, its inner diameter is such that it will not slide over the threads 40. It may also be noted that the continuous upper flange 50 is generally co-extensive with the head 36 but could be slightly larger or smaller than the head 36 depending on the application of the fastener.

The tapered expansion bushing 42 is provided with a relatively small diameter flange or shoulder 52 at its lower end, away from the head 36, in order to prevent the sleeve 44 from sliding downwardly and releasing the panel 46. In addition, it may be noted that the inner diameter of the sleeve 44 near the head 36 is substantially greater than the outer diameter of the flange 52 on the bushing 42, so that the slotted sleeve 44 may slide up and over the flange 52.

For completeness, it may be noted that the head 36 of the fastener 34 may be provided with any desired type of driving arrangements, such as a conventional slot, a Phillips, or Allen head recess, or the like. In addition, a coil spring may be provided between the head 36 and the flange 50, with the outer periphery of the flange 50 forming a cylindrical recess extending away from the panel 46 to enclose the coil spring. In this way, until a nut or other fastener is secured to the threads 40, the head will be spaced slightly away from the slotted sleeve 44, thus facilitating inspection. It is further noted that, if desired, the hole in the panel may be counterbored on the side of the panel away from the head of the fastener so that the lower ends of the bushing and sleeve do not extend below the surface of the panel. It is also noted that in certain practical embodiments which have been made, the bushing 42 has been formed of stainless steel, and the slotted sleeve 44 of aluminum. However, other suitable materials may, of course, be employed. It is also noted that the angle employed on the sleeve 42 was approximately 10 degrees; but substantially greater or lesser angles may be employed, depending on the desired length of the taper and the required expansion of the lower end of the slotted sleeve 44. Concerning another point, the expandable sleeve 44 need not be slotted but could be deformable or resilient by being formed of a suitable alloy or high strength plastic or composite material, to perform the expanding and securing function. Also, the lower flange 48 could be slightly angled as shown at 26 in FIG. 1 to facilitate assembly with the panel 46. It is further noted that, while the present invention has been disclosed in connection with a threaded fastener, it may be employed to hold other types of members either fasteners or otherwise in place in a panel or the like. Accordingly, the foregoing description and the accompanying drawings are to be considered as illustrative of the principles of the present invention and not limiting.

What is claimed is:

1. A captive fastener assembly for fastening through a hole of a predetermined diameter in a panel, said assembly comprising:
    a fastener having a head, a unthreaded cylindrical shank extending from said head, and fastening means on the outer end of said shank;
    an expandable sleeve for mounting on said shank, said sleeve having an upper flange toward the head of the screw, and a lower flange having a diameter following expansion greater than said predetermined diameter, a generally cylindrical shank following expansion equal to or slightly less than said predetermined diameter, and said sleeve having a normal configuration in the undeformed initial state with the lower flange having a diameter substantially equal to or of a smaller diameter than said predetermined diameter; and
    tapered means on said unthreaded shank adjacent the head of said screw for expanding the lower end of said sleeve starting from the same side of said panel as the head of said screw, said tapered means expanding said lower flange to engage said panel as said fastener assembly is pressed into the hole in said panel;
    whereby said fastener with the tapered means and unstressed expandable sleeve mounted thereon may be slipped through the hole in the panel, and further pressure on the head of the screw expands the lower flange of said expandable sleeve to lock over the inner edge of said panel.

2. A captive fastener assembly as defined in claim 1 wherein said tapered means is a tapered bushing made of stainless steel.

3. A captive fastener assembly as defined in claim 1 wherein said expandable sleeve is made of aluminum.

4. A captive fastener assembly as defined in claim 1 wherein said sleeve in the undeformed initial state has an inner diameter which tapers from a larger diameter toward the head of the screw to a smaller diameter at its other end.

5. A captive fastener assembly as defined in claim 1 wherein said tapered means has a greater length than said sleeve.

6. A captive fastener assembly as defined in claim 1 wherein means are provided for locking said sleeve in its expanded state.

7. A captive screw assembly for fastening through a hole of a predetermined diameter in a panel, said assembly comprising:

a screw having a head, a unthreaded cylindrical shank extending from said head, and screw threads having a greater outer diameter than said shank, on the outer end of said shank;

a slotted sleeve for mounting on said shank, said sleeve having a substantially continuous upper flange substantially co-extensive with the head of the screw, and slotted portions extending away from said flange toward the threads of said screw; and a slotted lower flange having a diameter following expansion greater than said predetermined diameter, a generally cylindrical shank following expansion substantially equal to or slightly less than said predetermined diameter, and said sleeve being slotted from near said upper flange through said lower flange and having a normal tapered configuration in the undeformed initial state with the slotted lower flange being of a substantially equal or a smaller diameter than said predetermined diameter;

tapered bushing means for expanding said slotted sleeve starting from the same side of said panel as the head of said screw, to force said slotted lower flange into a locking overlapping configuration with respect to the side of the panel away from the head of the screw, said bushing being mounted on said unthreaded cylindrical shank adjacent the head of the screw, said bushing having a small outwardly extending shoulder or flange means at its lower end away from the head of the screw, to lock said sleeve into its expanded state following full insertion of said bushing means into said slotted sleeve;

whereby said screw with the tapered bushing and unstressed slotted sleeve mounted thereon may be slipped through the hole in the panel, and further pressure on the head of the screw expands the lower flange of said slotted sleeve to lock over the inner edge of said panel, with said sleeve held in the locked expanded condition in position on said tapered bushing by engagement of the lower end of said sleeve with the shoulder or flange on the lower end of said bushing.

8. A captive screw assembly as defined in claim 7 wherein said tapered bushing is made of stainless steel.

9. A captive screw assembly as defined in claim 7 wherein said slotted sleeve is made of aluminum.

10. A captive screw assembly as defined in claim 7 wherein said sleeve in the undeformed initial state has an inner diameter which tapers from a larger diameter toward the head of the screw to a smaller diameter at its other end.

11. A captive screw assembly as defined in claim 7 wherein said bushing has a greater length than said slotted sleeve.

12. A captive fastener assembly for fastening through a hole of a predetermined diameter in a panel, said assembly comprising:

a fastener having a head, a unthreaded cylindrical shank extending from said head, and fastening means on the outer end of said shank;

an expandable sleeve for mounting on said shank, said sleeve having an upper flange toward the head of the screw, and a lower flange having a diameter following expansion greater than said predetermined diameter, a generally cylindrical shank following expansion equal to or slightly less than said predetermined diameter, and said sleeve having a normal configuration in the undeformed initial state with the smaller lower flange having a diameter substantially equal to or of a smaller diameter than said predetermined diameter, and the outer configuration of said sleeve in its undeformed initial state between the two flanges thereof being tapered from a larger diameter near the head of said screw to a smaller diameter away from the head of the screw;

tapered means on said shank adjacent the head of said screw for expanding the lower end of said sleeve starting from the same side of said panel as the head of said screw, said tapered means expanding said lower flange to engage said panel as said fastener assembly is pressed into the hole in said panel; and means for locking said sleeve in its expanded state in engagement with said panel;

whereby said fastener with the tapered means and unstressed expandable sleeve mounted thereon may be slipped through the hole in the panel, and further pressure on the head of the screw expands the lower flange of said expandable sleeve to lock over the inner edge of said panel, with said sleeve held in the locked expanded condition in position on said tapered means by said locking means.

13. A captive fastener assembly as defined in claim 12 wherein said tapered means is a tapered bushing made of stainless steel.

14. A captive fastener assembly as defined in claim 12 wherein said expandable sleeve is made of aluminum.

15. A captive fastener assembly as defined in claim 12 wherein said sleeve in the undeformed initial state has an inner diameter which tapers from a larger diameter toward the head of the screw to a smaller diameter at its other end.

16. A captive fastener assembly as defined in claim 12 wherein said tapered means has a greater length than said sleeve.

* * * * *